(12) United States Patent
Takabayashi et al.

(10) Patent No.: US 10,260,570 B2
(45) Date of Patent: Apr. 16, 2019

(54) FRICTION PLATE AND WET-TYPE MULTIPLE-DISC CLUTCH WITH FRICTION PLATE

(71) Applicant: NSK-WARNER K.K., Shinagawa-ku, Tokyo (JP)

(72) Inventors: Hideaki Takabayashi, Fukuroi (JP); Yousuke Ikeda, Fukuroi (JP); Masanori Okada, Fukuroi (JP); Masahiro Kobayashi, Fukuroi (JP); Osamu Tanaka, Fukuroi (JP); Fumimasa Muramatsu, Fukuroi (JP); Yoshinori Watanabe, Fukuroi (JP); Masahiro Yamada, Fukuroi (JP); Tsutomu Kawai, Fukuroi (JP); Kazuyuki Fujita, Fukuroi (JP)

(73) Assignee: NSK-WARNER K.K., Tokyo (JP)

(*) Notice: Subject to any disclaimer, the term of this patent is extended or adjusted under 35 U.S.C. 154(b) by 109 days.

(21) Appl. No.: 14/765,829

(22) PCT Filed: Jan. 31, 2014

(86) PCT No.: PCT/JP2014/000519
§ 371 (c)(1),
(2) Date: Aug. 4, 2015

(87) PCT Pub. No.: WO2014/122906
PCT Pub. Date: Aug. 14, 2014

(65) Prior Publication Data
US 2015/0369302 A1 Dec. 24, 2015

(30) Foreign Application Priority Data

Feb. 5, 2013 (JP) .............................. 2013-020453
Jan. 29, 2014 (JP) .............................. 2014-014047

(51) Int. Cl.
*F16D 13/64* (2006.01)
*F16D 13/52* (2006.01)
(Continued)

(52) U.S. Cl.
CPC .......... *F16D 13/648* (2013.01); *F16D 13/52* (2013.01); *F16D 13/72* (2013.01); *F16D 13/74* (2013.01);
(Continued)

(58) Field of Classification Search
CPC ......... F16D 13/648; F16D 13/52; F16D 13/74
See application file for complete search history.

(56) References Cited

U.S. PATENT DOCUMENTS 7,789,209 B2 * 9/2010 Miyazaki .............. F16D 13/648
192/113.36
7,958,984 B2 * 6/2011 Kobayashi .............. F16D 13/64
192/107 R
(Continued)

FOREIGN PATENT DOCUMENTS

CN 101743408 A 6/2010
JP 8-145091 A 6/1996
(Continued)

OTHER PUBLICATIONS

International Preliminary Report on Patentability from International Patent Application No. PCT/JP2014/000519, dated Aug. 20, 2015.
(Continued)

*Primary Examiner* — Jacob S. Scott
*Assistant Examiner* — Tinh Dang
(74) *Attorney, Agent, or Firm* — Shapiro, Gabor and Rosenberger, PLLC

(57) ABSTRACT

A friction plate has a plurality of friction material segments circularly fixed on an annular core plate, wherein each of the friction material segments includes an oil groove having an
(Continued)

opening that opens in the direction of an outer circumferential edge of the friction plate and an end portion that ends between an inner circumferential edge and the outer circumferential edge, oil passages in communication in the direction of the inner and the outer circumferential edges of the friction plate are provided among the friction material segments, and at least some of the oil passages have a first shape, the width of which in a circumferential direction decreases from the inner circumferential edge of the friction plate toward the outer circumferential edge thereof.

16 Claims, 6 Drawing Sheets

(51) Int. Cl.
    *F16D 13/72*     (2006.01)
    *F16D 13/74*     (2006.01)
    *F16D 69/00*     (2006.01)
    *F16D 25/0638*     (2006.01)
    *F16D 25/12*     (2006.01)
    *F16D 121/02*     (2012.01)

(52) U.S. Cl.
    CPC ....... *F16D 25/0638* (2013.01); *F16D 25/123* (2013.01); *F16D 69/00* (2013.01); *F16D 2069/004* (2013.01); *F16D 2121/02* (2013.01); *F16D 2300/0214* (2013.01)

(56) References Cited

U.S. PATENT DOCUMENTS

| | | | |
|---|---|---|---|
| 8,162,123 B2* | 4/2012 | Hirayanagi | F16D 13/648 192/107 R |
| 8,474,590 B2* | 7/2013 | Fabricius | F16D 13/648 192/107 R |
| 9,027,728 B2* | 5/2015 | Hiramatsu | F16D 13/648 192/113.36 |
| 2003/0010596 A1 | 1/2003 | Kitaori et al. | |
| 2007/0102258 A1 | 5/2007 | Miyazaki et al. | |
| 2008/0185256 A1 | 8/2008 | Kobayashi et al. | |
| 2009/0050434 A1 | 2/2009 | Okamura et al. | |
| 2010/0044182 A1* | 2/2010 | Sakabe | F16D 13/648 192/113.36 |
| 2012/0118696 A1 | 5/2012 | Fabricius et al. | |

FOREIGN PATENT DOCUMENTS

| | | | |
|---|---|---|---|
| JP | 2002-181073 A | 6/2002 | |
| JP | 2002-340071 A | 11/2002 | |
| JP | 2007-132362 A | 5/2007 | |
| JP | 2008-190638 A | 8/2008 | |
| JP | 2009-138901 A | 6/2009 | |
| JP | 2010-48272 A | 3/2010 | |
| JP | 2010-535996 A | 11/2010 | |
| JP | 2011-102645 A | 5/2011 | |

OTHER PUBLICATIONS

International Search Report from International Patent Application No. PCT/JP2014/000519, dated May 13, 2014.
Written Opinion of International Searching Authority for International Patent Application No. PCT/JP2014/000519, dated May 13, 2014.

* cited by examiner

FRICTION PLATE AND WET-TYPE MULTIPLE-DISC CLUTCH WITH FRICTION PLATE

TECHNICAL FIELD

The present invention relates to a friction plate used with a clutch, a brake or the like of an automatic transmission of a vehicle, and a wet-type multiple-disc clutch provided with the friction plate. More specifically, the present invention relates to an improvement of an oil passage formed in a friction surface of a friction plate.

BACKGROUND ART

In a typical wet-type multiple-disc clutch, friction plates and separator plates are alternately disposed between a clutch or brake drum and a hub. A clutch piston is pressed to engage the clutch or released to disengage the clutch.

In recent years, the demand for reducing the fuel consumption of an automobile is more than ever increasing. In an automatic transmission, accordingly, there has been ever-increasing demand for achieving a reduced drag torque between a friction plate and a separator plate in order to reduce a power loss when the clutch is in a disengagement mode.

In order to reduce a power loss, a typical wet-type multiple-disc clutch used with an automatic transmission (AT) is frequently configured to permit easy flow of a lubricating oil from an inner periphery side to an outer periphery side of the friction plate so as to reduce drag torque. As a technique for reducing the drag torque, there is known a technique described in, for example, PTL 1 or PTL 2. In the clutch described in PTL 1 and PTL 2, a friction plate is provided with an oil groove having an end surface thereof closed on the inner periphery side to keep the friction plate and a separator plate apart in the disengagement mode, and an oil passage for supplying lubricating oil to a friction surface to prevent seizure in an engagement mode, the oil passage penetrating in the direction of an inner diameter and an outer diameter.

In recent years, however, the clearance between a friction plate and a separator plate has been reduced, as compared with conventional clutches, in order to improve the responsiveness to a speed change so as to achieve improved power performance in addition to improved fuel economy. This has been leading to a tendency to increase the drag torque attributable to an intervening oil film at the time of idling.

Further, the oil supplied to the oil passage, which penetrates from the inner diameter side to the outer diameter side, is drawn toward a friction material due to rotation. Once the oil that has been drawn enters between a friction plate and a separator plate, it is difficult to drain the oil, especially in a small area with a smaller number of rotations in the clearance between the friction plate and the separator plate. This results in a large drag torque attributable to the viscosity between a friction material and a counterpart separator plate.

CITATION LIST

Patent Literature

PTL 1: Japanese Patent Application Laid-Open No. 2007-132362 (FIG. 6)

PTL 2: Japanese Patent Application Laid-Open No. 2010-48272 (FIG. 4)

SUMMARY OF INVENTION

Technical Problem

According to the prior arts described in PTL1 and PTL2, the lubricating oil overflowing from a first oil groove, which opens on the inner diameter side, rides over the friction surface and flows into a second oil groove, which opens on the outer diameter side, prematurely filling the groove with the oil, thus significantly reducing the volume of air to be taken into the second oil groove. This has resulted in a failure to reduce the shear resistance force of the lubricating oil, making it difficult to reduce the drag torque.

Accordingly, an object of the present invention is to provide a friction plate which takes a large volume of air into lubricating oil on a friction surface to reduce the shear resistance force of the lubricating oil intervening between a friction material and a separator plate, thereby achieving a significantly smaller drag torque at the time of idling, and a wet-type multiple-disc clutch provided with the friction plate.

Solution to Problem

To this end, a friction plate in accordance with the present invention is a friction plate composed of a plurality of friction material segments circularly fixed on an annular core plate, wherein each of the friction material segments includes an oil groove having an opening that opens in the direction of an outer circumferential edge of the friction plate and an end portion that ends between an inner circumferential edge and the outer circumferential edge, oil passages in communication in the direction of the inner circumferential edge and the outer circumferential edge of the friction plate are provided among the friction material segments, and at least some of the oil passages have a first shape, the width of which in a circumferential direction decreases from the inner circumferential edge of the friction plate toward the outer circumferential edge thereof.

Further, to fulfill the object described above, a friction plate in accordance with the present invention is a friction plate having an annular friction material fixed on an annular core plate, wherein the friction material includes oil grooves, each of which has an opening that opens in the direction of an outer circumferential edge of the friction plate and an end portion that ends between an inner circumferential edge and the outer circumferential edge, an oil passage in communication in the direction of the inner circumferential edge and the outer circumferential edge of the friction plate is provided between the oil grooves, and at least some of the oil passages have a first shape, the width of which in a circumferential direction decreases from the inner circumferential edge of the friction plate toward the outer circumferential edge thereof.

To fulfill the object described above, a wet-type multiple-disc clutch provided with the friction plate in accordance with the present invention is a wet-type multiple-disc clutch including a friction plate having a plurality of friction material segments which are circularly fixed on an annular core plate, and separator plates alternately disposed with the friction plates in an axial direction, wherein each of the friction material segments includes an oil groove having an opening that opens in the direction of an outer circumferential edge of the friction plate and an end portion that ends between an inner circumferential edge and the outer circumferential edge, an oil passage in communication in the direction of the inner circumferential edge and the outer circumferential edge of the friction plate is provided between the friction material segments, and at least some of the oil passages have a first shape, the width of which in a circumferential direction decreases from the inner circumferential edge of the friction plate toward the outer circumferential edge thereof.

Further, in order to fulfill the object described above, a wet-type multiple-disc clutch provided with the friction plate in accordance with the present invention is a wet-type multiple-disc clutch including a friction plate having an annular friction material fixed on an annular core plate and a separator plate alternately disposed with the friction plate in an axial direction, wherein the friction material includes an oil groove having an opening that opens in the direction of an outer circumferential edge of the friction plate and an end portion that ends between an inner circumferential edge and the outer circumferential edge, an oil passage in communication in the direction of the inner circumferential edge and the outer circumferential edge of the friction plate is provided between the oil grooves, and at least some of the oil passages have a first shape, the width of which in a circumferential direction decreases from the inner circumferential edge of the friction plate toward the outer circumferential edge thereof.

Advantageous Effects of Invention

The present invention provides the following advantageous effects.

The discharge amount of the lubricating oil in the oil passage in communication in the direction of the inner circumferential edge and the outer circumferential edge is adjusted thereby to control the lubricating oil that rides over the friction surface, thus making it possible to easily take air into the oil groove that opens in the direction of the outer circumferential edge. This permits a reduction in the drag torque.

The penetrating part of the oil passage, which is narrowed on the outer circumferential edge side, makes it possible to also secure the drawing apart effect by a dynamic pressure groove.

The friction material surface is provided with the oil groove that opens only on the outer diameter side, so that the oil that has been drawn onto the friction surface from the oil passage is smoothly drained to the outer diameter side. This permits reduced drag torque at the time of idling. The effect for reducing the drag torque is especially marked at the time of low-speed rotation.

Further, one oil groove is formed in one friction material segment, so that the number of friction material segments provided in a single friction plate can be increased. Therefore, the cooling efficiency can be improved by increasing the number of the oil passages, and the temperatures of the separator plates when the clutch is engaged can be reduced.

DESCRIPTION OF EMBODIMENTS

Figure 1:
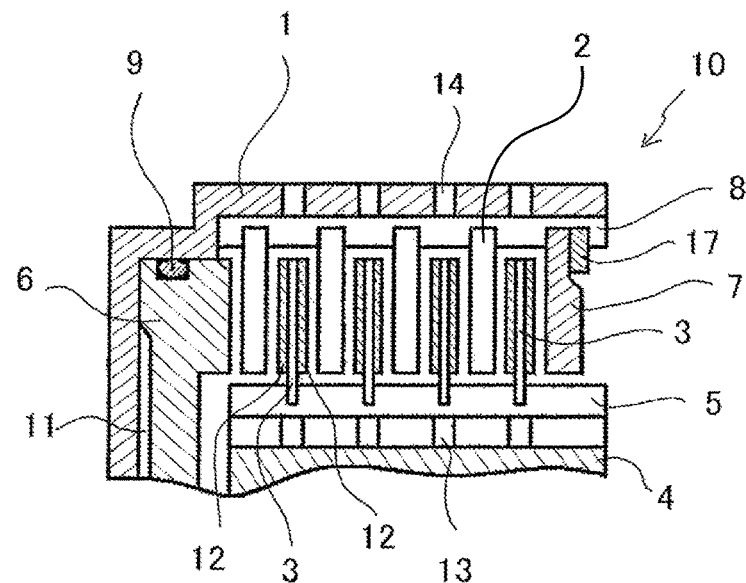
FIG. 1 is a partial sectional view in an axial direction of a wet-type multiple-disc clutch provided with a friction plate in accordance with the present invention.

The following will describe the present invention in detail with reference to the accompanying drawings. In the drawings, like components will be assigned like reference numerals.

FIG. 1 is a partial sectional view in an axial direction of a wet-type multiple-disc clutch 10 provided with a friction plate in accordance with the present invention. The sectional view is applicable to the friction plates of a first embodiment and a second embodiment, which will be discussed hereinafter.

The wet-type multiple-disc clutch 10 is constituted of a substantially cylindrical clutch case 1, which is open at one end thereof in the axial direction, a hub 4, which is disposed on the inner periphery of the clutch case 1 and which coaxially and relatively rotates, annular separator plates 2, which are disposed movably in the axial direction on a spline 8 provided on the inner periphery of the clutch case 1, and annular friction plates 3, which are disposed alternately with the separator plates 2 in the axial direction on a spline 5 provided on the outer periphery of the hub 4 and to which friction materials are attached. A plurality of separator plates 2 and a plurality of friction plates 3 are provided.

The clutch case 1 has a plurality of through holes 14 in the outer peripheral part thereof. A lubricating oil that has been supplied from an inner diameter side and has lubricated the clutch section moves to the outer diameter side due to a centrifugal force and passes through the through holes 14 to be drained outside. It is needless to say that the present invention can be applied also to a wet-type multiple-disc clutch having the clutch case 1 not provided with the through holes 14.

The wet-type multiple-disc clutch 10 includes a piston 6, which presses and fastens the separator plates 2 and the friction plates 3 so as to engage the wet-type multiple-disc clutch 10, a backing plate 7 provided on the inner periphery of the clutch case 1 to hold the separator plates 2 and the friction plates 3 in a fixed state at one end in the axial direction, and a retaining ring 17 that retains the backing plate 7.

As illustrated in FIG. 1, the piston 6 is disposed slidably in the axial direction in a closed end of the clutch case 1. An O-ring 9 is interposed between the outer peripheral surface of the piston 6 and the inner surface of the clutch case 1.

Further, a sealing member (not illustrated) is interposed between the inner peripheral surface of the piston 6 and the outer peripheral surface of the cylindrical section (not illustrated) of the clutch case 1. Thus, an oil pressure chamber 11 in an oil-tight state is defined by the inner surface of the closed end of the clutch case 1 and the piston 6.

Friction materials 12 having a predetermined frictional coefficient are fixed to both surfaces of each of the friction plates 3 retained by the hub 4 slidably in the axial direction. Alternatively, however, the friction materials 12 may be provided on only one surface of each of the friction plates 3. Further, the hub 4 is provided with lubricating oil supply ports 13 penetrating in the radial direction. The lubricating oil is supplied from the inner diameter side to the outer diameter side of the wet-type multiple-disc clutch 10 through the lubricating oil supply ports 13.

Figure 2:
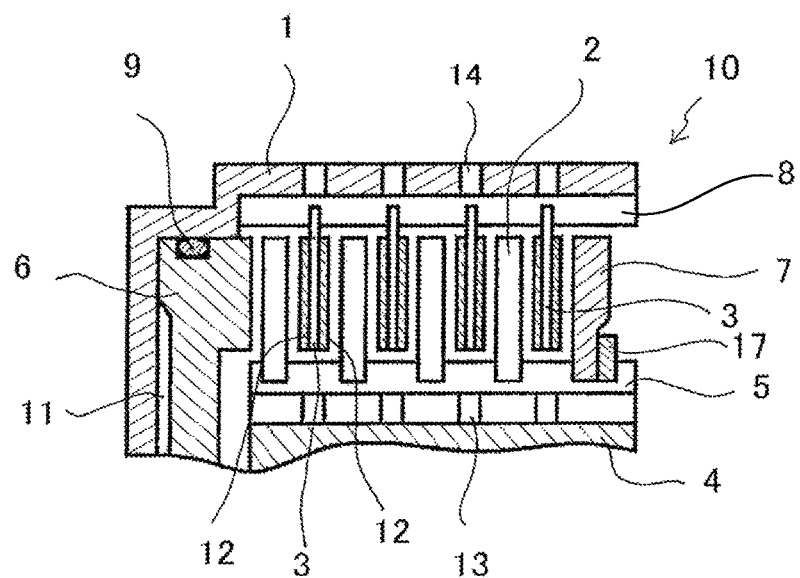
FIG. 2 is a partial sectional view in the axial direction of another type of a wet-type multiple-disc clutch provided with the friction plate in accordance with the present invention.

FIG. 2 is a partial sectional view in the axial direction of another type of a wet-type multiple-disc clutch provided with the friction plates in accordance with the present invention. The basic configuration is the same as that of the wet-type multiple-disc clutch 10 illustrated in FIG. 1, so that only different aspects will be described. The configuration of the spline engagement between friction plates 3 and separator plates 2 illustrated in FIG. 2 is the reverse of the configuration of the spline engagement therebetween illustrated in FIG. 1. In this type of the wet-type multiple-disc clutch 10 illustrated in FIG. 2, the friction plates 3 engage with the spline 8 of the clutch case 1, while the separator plates 2 engage with a spline 5 of the hub 4. Further, a backing plate 7 and a retaining ring 17, which retains the backing plate 7, are also attached to the hub 4.

The wet-type multiple-disc clutch 10 configured as described above is engaged and disengaged as follows. FIG. 1 illustrates the clutch in a disengaged state, in which the separator plates 2 and the friction plates 3 are apart, i.e. not in contact with each other. In the disengaged state, a piston 6 is in contact with the closed end of the clutch case 1 due to the urging force of a return spring (not illustrated).

To engage the clutch in the aforesaid state, an oil pressure is supplied into the oil pressure chamber 11 defined by the piston 6 and a clutch case 1. As the oil pressure increases, the piston 6 moves to the right in the axial direction in FIG. 1 against the urging force of the return spring (not illustrated), causing the separator plates 2 and the friction plates 3 to come in close contact with each other. Thus, the clutch is engaged.

To disengage the clutch again in the engaged state, the oil pressure in the oil pressure chamber 11 is released. Upon the release of the oil pressure, the piston 6 is moved by the urging force of the return spring (not illustrated) to a position at which the piston 6 comes in contact with the closed end of the clutch case 1. Thus, the clutch is disengaged.

First Embodiment

Figure 3:
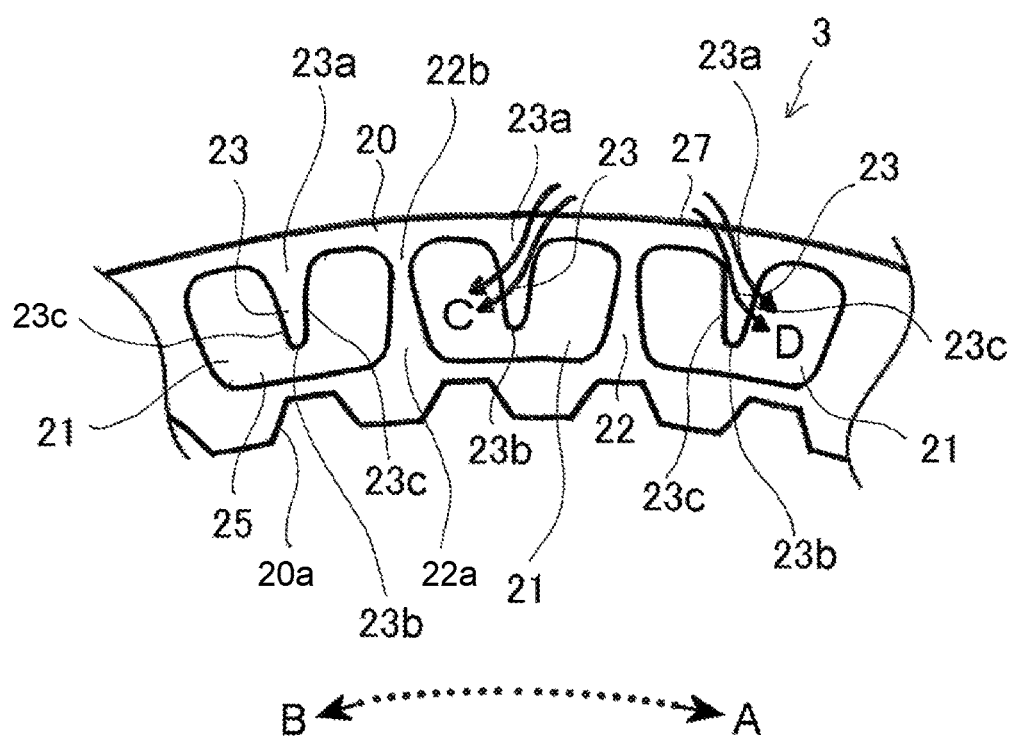
FIG. 3 is a partial front view of a friction plate illustrating a first embodiment of the present invention.

FIG. 3 is a partial front view of a friction plate 3 illustrating a first embodiment of the present invention. The friction plate 3 has a substantially annular core plate 20 provided with friction surfaces 25 formed by attaching a plurality of friction material segments 21, which are arranged substantially at equal intervals in the circumferential direction and which are attached to the core plate 20 by an adhesive agent or the like. The inner periphery of the core plate 20 is provided with a spline 20a, which engages with the spline 5 of the hub 4.

As illustrated in FIG. 3, each of the friction material segments 21 includes an oil groove 23 having an opening 23a, which opens in the direction of an outer circumferential edge 27 of the friction plate 3, and an end portion 23b, which ends between the inner and the outer circumferential edges. Each of the friction material segments 21 is provided with a single oil groove 23, which does not penetrate in the inner diameter direction.

A gap having a predetermined width in the circumferential direction is provided between adjoining friction material segments 21. The surface of the core plate 20 is exposed through the gap, and the exposed surface area defines an oil passage 22, which is in communication with the inner and the outer circumferential edges of the friction plate 3.

According to the first embodiment, the identical friction material segments 21 are arranged at substantially equal intervals in the circumferential direction. The friction material segments 21 will be described in detail. As described above, each of the friction material segments has the oil groove 23. The oil groove 23 extends to substantially the center in the circumferential direction of the friction material segment 21 and ends between the inner and the outer circumferential edges. The length of the oil groove 23 in the radial direction is equal to or more than half the width of the friction material segment 21 in the radial direction. This means that the end portion 23b of the oil groove 23 is positioned closer to the inner diameter side by more than half the width in the radial direction.

The oil groove 23 is defined by two tapered surfaces 23c diverging at a predetermined angle toward the outer circumferential edge of the friction plate 3. The inclination angle is set at a predetermined angle, forming a laterally symmetrical shape with respect to a centerline.

A description will now be given of the oil passage 22. The oil passage 22 has a first opening 22a, which opens toward the inner circumferential edge of the friction plate 3, and a second opening 22b, which opens toward the outer circumferential edge of the friction plate 3. As can be understood from FIG. 3, the first opening 22a has a larger width in the circumferential direction than the second opening 22b. Hence, the width of the oil passage 22 in the circumferential direction gradually decreases toward the outer circumferential edge of the friction plate 3. In other words, the oil passage 22 has a first shape that narrows from the inner periphery toward the outer periphery. This shape holds a constant gap between the friction plate 3 and the separator plate 2, thus providing the separating effect for separating the friction plate 3 and the separator plate 2 from each other.

According to the first embodiment, the oil passage 22 and the oil groove 23 retain the same shapes in the circumferential direction over the entire circumference of the friction plate 3. In the state illustrated in FIG. 3, if the wet-type multiple-disc clutch 10 rotates in the direction indicated by an arrow A, then air will be continuously taken into the oil groove 23 from the direction of the outer circumference of the friction plate 3 as indicated by arrows C during the rotation. The air that has passed through the oil groove 23 rides onto the friction surface 25.

Conversely, if the wet-type multiple-disc clutch 10 rotates in a direction indicated by an arrow B in the state illustrated in FIG. 3, then air will be continuously taken into the oil groove 23 from the direction of the outer circumference of the friction plate 3 as indicated by arrows D during the rotation. The air that has passed through the oil groove 23 rides onto the friction surface 25.

The oil passage 22 penetrates in the direction of the outer circumferential edge (the outer diameter side) of the friction plate 3. This makes it possible to adjust the discharge amount of the lubricating oil, thus restraining the lubricating oil from riding over the friction surface 25. Therefore, the movement of the air flowing from the oil groove 23 onto the friction surface 25 will not be interfered with, thus improving the performance for taking the air onto the friction surface 25. Further, the oil passage 22 has the shape, the width of which in the circumferential direction decreases toward the outer diameter side, so that the oil passage 22 functions as the dynamic pressure groove as usual, thereby securing the aforesaid separating effect.

Second Embodiment

Figure 4:
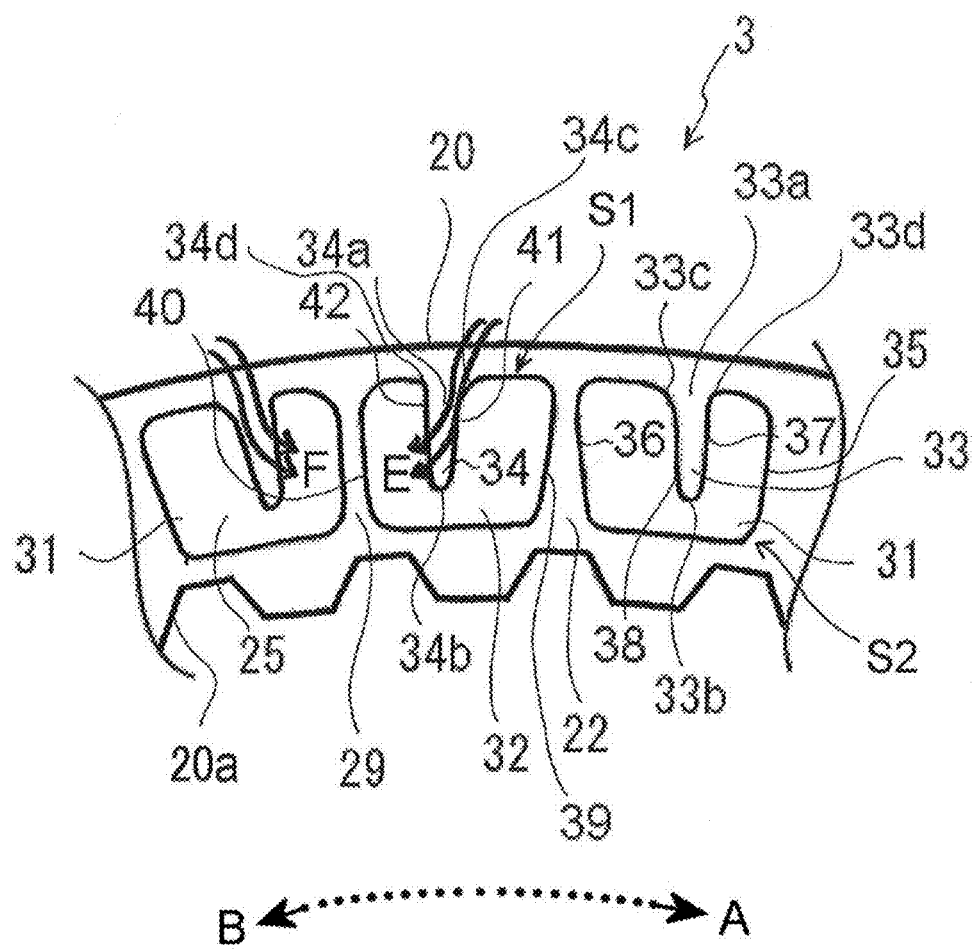
FIG. 4 is a partial front view of a friction plate illustrating a second embodiment of the present invention.

FIG. 4 is a partial front view of a friction plate 3 illustrating a second embodiment of the present invention. In the second embodiment, the friction material segments adhesively fixed to a core plate 20 have different shapes. According to the second embodiment, friction material segments having two different shapes are fixed to the core plate 20 in the same manner as the first embodiment. A friction material segment 31 includes an oil groove 33 having an opening 33a, which opens in the direction of the outer circumferential edge of the friction plate 3, and a closed end portion 33b, which ends between the inner and the outer circumferential edges. The length of the oil groove 33 in the radial direction is equal to or more than half the width of the friction material segment 31 in the radial direction. This means that the end portion 33b of the oil groove 33 is positioned closer to the inner diameter side by more than half the width in the radial direction.

As can be understood from FIG. 4, the oil groove 33 is provided at a position closer to a side portion 35 in the circumferential direction of a friction surface 25 of the friction material segment 31. A surface 37 of the oil groove 33 adjacent to the side portion 35 extends in a substantially diameter direction of the friction plate 3. A tapered surface 38 opposing the side portion 35 extends at a predetermined angle with respect to a diameter direction. The opening angle of the opening 33a is set to a predetermined angle.

As with the friction material segment 31, another friction material segment 32 includes an oil groove 34 having an opening 34a, which opens in the direction of the outer circumferential edge of the friction plate 3, and a closed end portion 34b, which ends between the inner and the outer circumferential edges. The length of the oil groove 34 in the radial direction is equal to or more than half the length of the friction material segment 32 in the radial direction. This means that the end portion 34b of the oil groove 34 is positioned closer to the inner diameter by more than half the width in the radial direction. The oil grooves 33 and 34 have shapes that are laterally asymmetrical.

As illustrated in FIG. 4, the oil groove 34 is provided closer to an end portion 40 in the circumferential direction of the friction surface 25 of the friction material segment 32. A surface 42 of the oil groove 34 that is adjacent to the end portion 40 extends substantially in the diameter direction of the friction plate 3, and a tapered surface 39 opposing the end portion 40 extends at a predetermined angle with respect to the diameter direction. The opening angle of the opening 34a is set to a predetermined angle.

The friction material segments 31 and 32 have a relationship like a front and a back or like a mirror image. As illustrated in FIG. 4, the oil grooves 33 and 34 are disposed in a biased manner away from each other. In the second embodiment, the friction material segments 31 and the friction material segments 32 are arranged adjacently and alternately in the circumferential direction.

A description will now be given of the oil passages in the second embodiment. According to the second embodiment, as with the friction material segments, there are provided oil passages in two shapes, which penetrate from the outer circumferential edge to the inner circumferential edge of the friction plate 3. An oil passage 22 is formed of a passage having substantially the same configuration as that in the first embodiment. Meanwhile, an oil passage 29 has a second shape, which is a straight shape having the width in the circumferential direction remaining the same from the outer circumferential edge to the inner circumferential edge of the friction plate 3.

The oil passage 22 and the oil passage 29 are alternately arranged in the circumferential direction. Further, the friction material segments 31 and 32 are arranged adjacently and alternately in the circumferential direction. The oil passage 22 is disposed at a position apart from the oil grooves 33 and 34 of the adjoining friction material segments 31 and 32, respectively. Further, the oil passage 29 is disposed at a position close to the oil grooves 33 and 34 of the adjoining friction material segments 31 and 32, respectively.

In the state illustrated in FIG. 4, if a wet-type multiple-disc clutch 10 rotates in the direction indicated by the arrow A, then air will be continuously taken into the oil groove 34 from the direction of the outer periphery of the friction plate 3 as indicated by arrows E during the rotation. The air that has passed through the oil groove 34 rides onto the friction surface 25.

Conversely, if the wet-type multiple-disc clutch 10 rotates in a direction indicated by the arrow B in the state illustrated in FIG. 4, then air will be continuously taken into the oil groove 33 from the direction of the outer periphery of the friction plate 3 as indicated by arrows F during the rotation. The air that has passed through the oil groove 33 rides onto the friction surface 25.

A description will now be given of openings 33a and 34a of the oil groove 33 and the oil groove 34, respectively. As with the oil groove 23 in the first embodiment, the opening 33a and the opening 34a open at predetermined opening angles such that the widths thereof in the circumferential direction increase toward the outer circumferential edge of the friction plate 3. Meanwhile, both edge parts of the opening 23a of the oil groove 23 in the circumferential direction have substantially the same shape in the first embodiment, whereas the oil groove 33 and the oil groove 34 have different shapes as follows.

The opening amount of the oil groove 33 is larger at an edge 33c. The minimum opening angle is defined by an edge 33d, and the opening angle is parallel to a normal. In other words, a side surface 37, which will be discussed hereinafter, is parallel to the normal.

The friction material segment 31 has two side portions 35 and 36 in the circumferential direction. Further, the oil groove 33 is defined by the side surface 37 and the tapered surface 38. The side surface 37 has an edge 33d in the opening 33a, and the tapered surface 38 has the edge 33c in the opening 33a. As can be understood from FIG. 4, the oil groove 33 is provided closer to the side portion 35 of the friction material segment 31 in a biased manner in the circumferential direction. Hence, the friction surface 25 closer to the side portion 36 is wider.

Meanwhile, the friction material segment 32 adjoining the friction material segment 31 has tapered portion 39 and side portion 40 in the circumferential direction. Further, the oil groove 34 is defined by the side surface 42 and a slope surface 41. The side surface 42 has an edge 34c in the opening 34a and the slope surface 41 has an edge 34d in the opening 34a. As can be understood from FIG. 4, the oil groove 34 is provided closer to the side portion 40 of the friction material segment 32 in a biased manner in the circumferential direction. Hence, the friction surface 25 closer to the tapered portion 39 is wider.

Similarly, as is obvious from FIG. 4, the oil passage 22, which tapers toward the outer diameter, is composed of the side portion 36 and the tapered portion 39, which are inclined with respect to the circumferential direction. The oil passage 22 is sandwiched between the wider friction surfaces of the two friction material segments 31 and 32.

As described above, according to the second embodiment, the same numbers of the oil passages 22 and the oil passages 29, which penetrate in the radial direction, are alternately disposed in the circumferential direction. However, the ratio between these two types of the oil passages 22 and the oil passages 29 can be arbitrarily changed. For example, if a larger volume of a lubricating oil to be supplied is required, then the number of the oil passages 29 having the straight shape should be increased and the number of the oil passages 22 having the tapered shape should be decreased. In other words, the ratio between the two types of the oil passages can be changed according to the required volume of oil to be supplied.

If the rotational direction of the friction plates 3 is not limited to the rotational direction of the arrow A or the rotational direction of the arrow B, and the friction plates 3 are rotated in both forward and reverse directions, then a friction material segment S1 and a friction material segment S2, which is adjacent to the segment S1, are disposed as a paired unit, as illustrated in FIG. 4, in order to prevent erroneous assembly when assembling the segments. It is needless to mention that the paired friction material segments S1 and S2 are symmetrically laid out, sandwiching the oil passage 22 therebetween.

Third Embodiment

Figure 5:
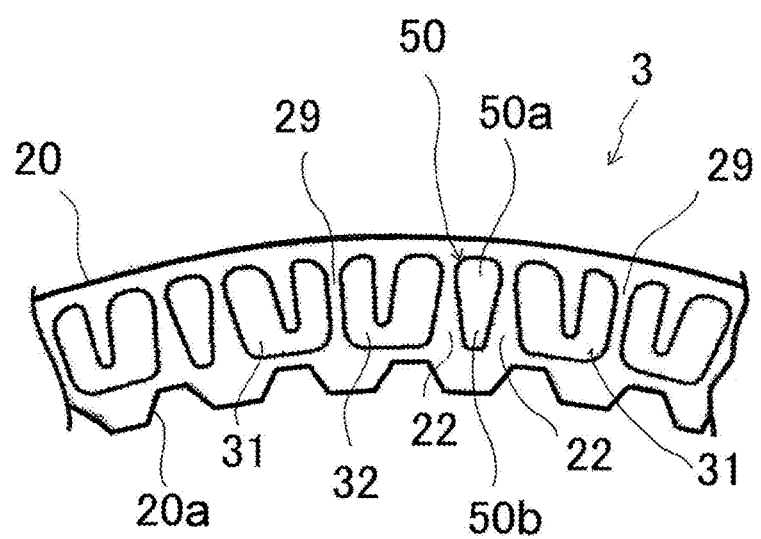
FIG. 5 is a partial front view of a friction plate illustrating a third embodiment of the present invention.

FIG. 5 is a partial front view of a friction plate illustrating a third embodiment of the present invention. The third embodiment is a modified example of the second embodiment. A friction material segment 31 and a friction material segment 32 share the same configurations as those in the second embodiment. According to the third embodiment, a friction material piece 50 provided with no oil groove is disposed between a pair of friction material segments composed of the friction material segment 31 and the friction material segment 32, which are adjacent to each other.

As illustrated in FIG. 5, the friction material piece 50 has no oil groove, which is provided in the friction material segments in the first embodiment and the second embodiment and which opens in the direction of an outer circumferential edge. The friction material piece 50 is shaped such that the width thereof in the circumferential direction decreases from an outer diameter part 50a toward an inner diameter part 50b. Hence, providing the friction material piece 50 between the friction material segment 31 and the friction material segment 32 creates oil passages 22, which have tapered shapes, on both sides of the friction material piece 50 in the circumferential direction, i.e. between the friction material segment 31 and the friction material piece 50 and between the friction material segment 32 and the friction material piece 50. The oil passages 22 share the same shapes and functions as those of the oil passages 22 in the first embodiment and the second embodiment.

In the second embodiment, the oil passages 29 having the straight shapes and the oil passages 22 having the tapered shapes are alternately arranged in the circumferential direction. In the third embodiment, the oil passages 22 having the tapered shapes are disposed adjacently to each other with the friction material piece 50 positioned therebetween and the oil passage 29 having the straight shape is defined by the friction material segment 31 and the friction material segment 32. A pair of the oil passage 22 and the oil passage 29 is alternately arranged in the circumferential direction.

Fourth Embodiment

Figure 6A:
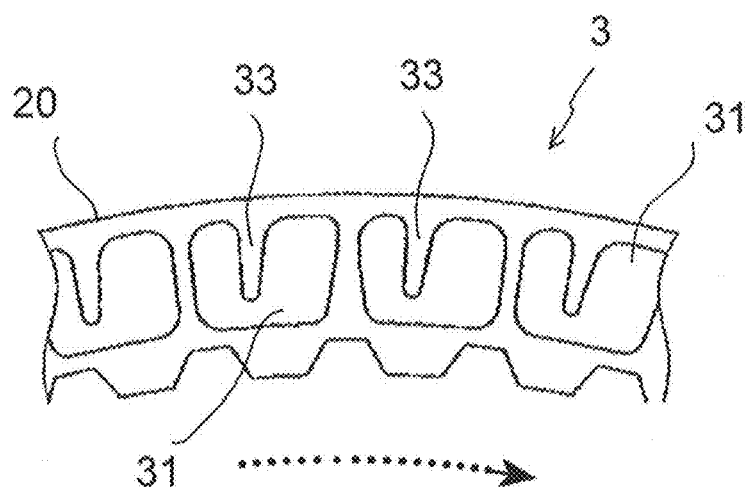
FIG. 6A is a partial front view of a friction plate illustrating a fourth embodiment of the present invention.
Figure 6B:
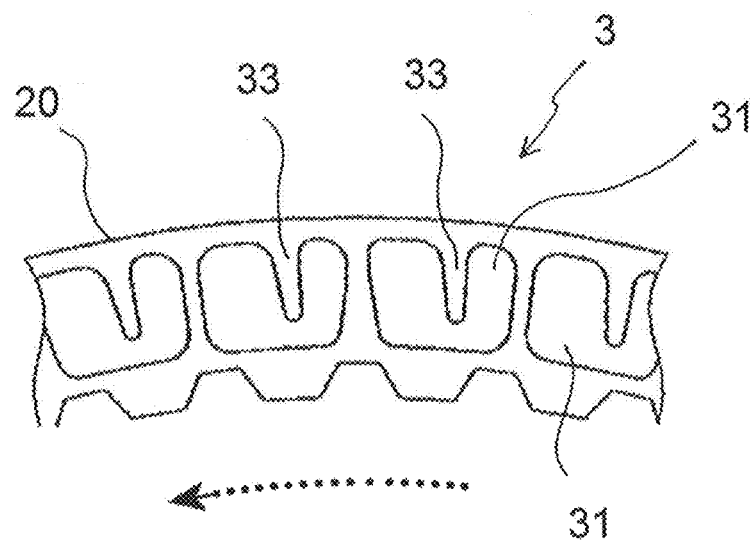
FIG. 6B is another partial front view of the friction plate illustrating the fourth embodiment of the present invention.

FIGS. 6A and 6B are partial front views of a friction plate illustrating a fourth embodiment of the present invention. If a friction plate 3 rotates in one direction as indicated by the arrow, then friction material segments 31 are arranged as illustrated in FIG. 6A. All the friction material segments 31 are arranged such that the phases of oil grooves 33 in a rotational direction (a circumferential direction) become the same. In other words, the friction material segments 31 having the same shape are continuously arranged in the circumferential direction.

If the friction plate 3 rotates in the reverse direction, as illustrated in FIG. 6B, then all the friction material segments 31 are arranged such that the phases in the rotational direction (the circumferential direction) which is opposite from that in FIG. 6A become the same. Meanwhile, according to the fourth embodiment, the opening angles of the openings of the oil grooves 33, which will be discussed hereinafter, are set to be the same according to the rotational direction.

Figure 7:
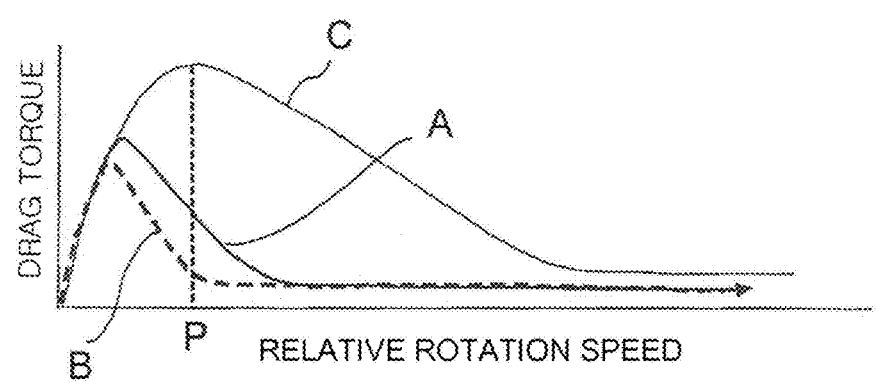
FIG. 7 is a graph illustrating the comparison between the drag torque in the friction plates according to the embodiments of the present invention and the drag torque in a conventional friction plate.

FIG. 7 is a graph illustrating the comparison between a drag torque in the friction plates in the embodiments of the present invention and the drag torque of a conventional friction plate. Curve A indicates the drag torques of the first to the third embodiments of the present invention, and a curve C indicates the drag torque in a conventional art. Further, a curve B indicates the drag torque of the fourth embodiment of the present invention.

The graph indicates that the drag torque at a point P, at which the relative rotational speed is low, is significantly lower than that of the conventional friction plate. The configuration of the fourth embodiment, in particular, results in a further markedly reduced drag torque. This means that providing the oil passages 22 significantly contributes to the effect for drawing air onto the friction surfaces through the oil grooves 23, 33 and 34. The drag torque further decreases as compared with the curve B, and the drag torque markedly decreases in an early stage, in which the relative rotational speed is low, as illustrated by the curve A, and the drag torque is maintained at a low level even when the relative rotational speed increases.

Obviously, various designs can be implemented according to the volume of oil to be supplied and the rotational conditions to be applied. Further, various modifications of the oil passages and the oil grooves are possible according to a friction area, a friction characteristic, the volume of oil to be supplied, or the like.

Figure 8:
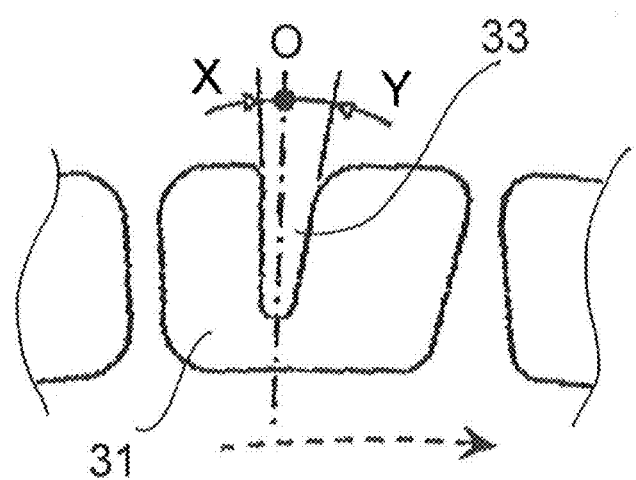
FIG. 8 is a schematic diagram illustrating the relationship among the angles of the openings of the oil grooves in the embodiments.

FIG. 8 is a schematic diagram illustrating the opening angles of the openings of the oil grooves in the embodiments. The core plate 20 is not illustrated. In the opening of the oil groove 33 of the friction material segment 31, two opening angles are defined by a centerline O of the annular friction plate 3. The arrow indicates the rotational direction of the friction plate 3.

An opening angle Y defined by one side surface of the oil groove 33 and the centerline O at the leading end side in the rotational direction and an opening angle X defined by the other side surface of the oil groove 33 and the centerline O at the trailing end side are set within the range of zero to 15 degrees. At this time, the oil groove 33 can be formed such that the magnitude of the opening angle X is equal to or less than the magnitude of the opening angle Y (X≤Y). This makes it possible to take more air into the lubricating oil that exists on the friction surface.

In the embodiments described above, the friction material segments are attached by applying an adhesive agent to the core plate 20. Alternatively, however, sticker type friction material segments or friction materials with an adhesive agent applied to the back surfaces thereof may be placed on the core plate 20 and then attached by pressing and heating. Further, the oil passages may alternatively be formed among the friction material segments and only the oil grooves may be formed in the friction material segments by pressing or the like.

In the embodiments described above, a plurality of the friction material segments or the friction material segments including the friction material pieces are fixed to the core plate to form the friction plate. Alternatively, however, an annular friction material may be fixed to a core plate and then the oil passages and the oil grooves having the foregoing shapes may be formed by pressing or the like.

Further, as is obvious from the first to the fourth embodiments illustrated in FIG. 3 to FIGS. 6A and 6B, the single oil groove is formed in the single friction material segment. This arrangement makes it possible to increase the number of friction material segments provided in a single friction plate. Thus, the cooling efficiency can be improved by increasing the number of the oil passages, making it possible to decrease the temperature of the separators when the clutch is engaged.

The present application claims the priority right from Japanese Patent Application No. 2013-020453 filed on Feb. 5, 2013 and Japanese Patent Application No. 2014-014047 filed on Jan. 29, 2014, the disclosure of which is incorporated by reference herein in its entirety.

REFERENCE SIGNS LIST

1 clutch case
2 separator plate
3 friction plate
4 hub
5 spline
6 piston
8 spline
10 wet-type multiple-disc clutch
21, 31, 32 friction material segment
22, 29 oil passage
23, 33, 34 oil groove
25 friction surface
27 outer circumferential edge
23a, 33a, 34a opening
50 friction material piece
X, Y opening angle

The invention claimed is:

1. A friction plate comprising a plurality of friction material segments circularly fixed on a line on an annular core plate;
   wherein each of the friction material segments includes only a single oil groove penetrating, at a first end, a circumferential edge of the respective friction material segment that faces an outer circumferential edge of the friction plate and terminating, at a second end, between an inner circumferential edge of the friction plate and the outer circumferential edge,
   wherein each oil groove is offset from a center in a circumferential direction of the respective friction material segment,
   wherein a surface of the oil groove closest to one end portion of the respective friction material segment extends in a substantially radial direction of the friction plate, and a tapered surface of the oil groove opposing said surface extends at a predetermined angle with respect to said radial direction,
   wherein the second end of the oil groove ends at a position that is equal to or more than half a width in said radial direction of the respective friction material segment,
   wherein oil passages in communication in a direction of the inner circumferential edge and the outer circumferential edge of the friction plate are provided among the friction material segments,
   wherein at least some of the oil passages have a first shape, a width of which in the circumferential direction decreases from the inner circumferential edge of the friction plate toward the outer circumferential edge thereof, and others of the oil passages have a second shape, a width of which in the circumferential direction remains unchanged from the inner circumferential edge of the friction plate to the outer circumferential edge thereof, and
   wherein the at least some of the oil passages having the first shape and the others of the oil passages having the second shape are alternately arranged in the circumferential direction.

2. The friction plate according to claim 1, wherein a width of each oil groove in the circumferential direction decreases from the first end toward the second end.

3. The friction plate according to claim 1,
   wherein a friction material piece not provided with an oil groove is provided within one of the oil passages having the first shape.

4. The friction plate according to claim 1, wherein each friction material segment does not have a groove which opens in a direction of the inner circumferential edge of the friction plate and which terminates between the inner circumferential edge and the outer circumferential edge.

5. A wet-type multiple-disc clutch comprising the friction plate according to claim 1 and a separator plate disposed alternately with the friction plate in an axial direction.

6. A friction plate comprising an annular friction material fixed on an annular core plate;
   wherein the annular friction material includes oil grooves, each of which penetrates, at a first end, a circumferential edge of the annular friction material that faces an outer circumferential edge of the friction plate and terminating, at a second end, between an inner circumferential edge of the friction plate and the outer circumferential edge,
   wherein the second end of the oil groove ends at a position that is equal to or more than half a width in a radial direction of the annular friction material,
   wherein oil passages in communication in a direction of the inner and the outer circumferential edges of the friction plate are provided among the oil grooves,
   wherein each oil groove is offset from a center between an adjacent pair of the oil passages,
   wherein at least some of the oil passages have a first shape, a width of which in a circumferential direction decreases from the inner circumferential edge of the friction plate toward the outer circumferential edge thereof, and others of the oil passages have a second shape, a width of which in the circumferential direction remains unchanged from the inner circumferential edge of the friction plate to the outer circumferential edge thereof, and wherein the at least some of the oil passages having the first shape and the others of the oil passages having the second shape are alternately arranged in the circumferential direction.

7. The friction plate according to claim 6, wherein a width of each of the oil grooves in the circumferential direction decreases from the first end toward the second end.

8. The friction plate according to claim 6, wherein the annular friction material does not have a groove which opens in a direction of the inner circumferential edge of the friction plate and terminates between the inner circumferential edge and the outer circumferential edge.

9. A wet-type multiple-disc clutch comprising the friction plate according to claim 6 and a separator plate disposed alternately with the friction plate in an axial direction.

10. The friction plate according to claim 6, wherein an opening of the oil groove at the first end has two opening angles in a rotational direction, sandwiching a centerline of the friction plate, and a magnitude of the opening angle defined on a trailing end side in the rotational direction is equal to or less than a magnitude of the opening angle defined on a leading end side in the rotational direction.

11. The friction plate according to claim 1, wherein at least some of the friction material segments are of a first type, which has the respective oil groove provided on a trailing end side in a rotational direction, wherein others of the friction material segments are of a second type, which has the respective oil groove provided on a leading end side in the rotational direction, and wherein the at least some of the friction material segments having the first type and the others of the friction material segments having the second type are alternately arranged in the circumferential direction.

12. The friction plate according to claim 3, wherein the friction material piece is shaped such that its width in the circumferential direction decreases from the inner circumferential edge of the friction plate toward the outer circumferential edge of the friction plate.

13. The friction plate according to claim 1, wherein an opening of the oil groove at the first end has two opening angles in a rotational direction, sandwiching a centerline of the friction plate, and a magnitude of the opening angle defined on a trailing end side in the rotational direction is equal to or less than a magnitude of the opening angle defined on a leading end side in the rotational direction.

14. The friction plate according to claim 1, wherein the oil groove has an opening, which opens in the direction of the outer circumferential edge of the friction plate, and a closed end portion, which ends between the inner circumferential edge and the outer circumferential edge.

15. The friction plate according to claim 1, wherein the second end of the oil groove ends at a middle of the respective friction material segment in the radial direction or between the middle of the respective friction material segment and the inner circumferential edge of the friction plate.

16. The friction plate according to claim 6, wherein the second end of the oil groove ends at a middle of the annular friction material in the radial direction of the friction plate or between the middle and the inner circumferential edge of the friction plate.

* * * * *